(12) United States Patent
Kinerk et al.

(10) Patent No.: US 7,138,977 B2
(45) Date of Patent: Nov. 21, 2006

(54) PROPORTIONAL FORCE INPUT APPARATUS FOR AN ELECTRONIC DEVICE

(75) Inventors: Keith Kinerk, Fontana, WI (US); Daniel Wong, Wildwood, IL (US)

(73) Assignee: Motorola, Inc., Schaumburg, IL (US)

( * ) Notice: Subject to any disclaimer, the term of this patent is extended or adjusted under 35 U.S.C. 154(b) by 311 days.

(21) Appl. No.: 10/342,675

(22) Filed: Jan. 15, 2003

(65) Prior Publication Data

US 2004/0135765 A1 Jul. 15, 2004

(51) Int. Cl.
*G09G 5/00* (2006.01)
*H04M 1/00* (2006.01)

(52) U.S. Cl. .................... 345/156; 455/556.1

(58) Field of Classification Search ........ 345/156–184; 463/37, 38; 455/556.1, 556.2, 566; 178/18.01–18.11, 178/19.01–19.07
See application file for complete search history.

(56) References Cited

U.S. PATENT DOCUMENTS

| 5,287,121 | A | * | 2/1994 | Louis et al. ................. 345/179 |
| RE35,016 | E | * | 8/1995 | Gullman et al. ....... 73/862.041 |
| 5,591,082 | A | | 1/1997 | Jensen et al. |
| 5,611,731 | A | | 3/1997 | Bouton et al. |
| 5,847,694 | A | | 12/1998 | Redford et al. |
| 6,201,524 | B1 | * | 3/2001 | Aizawa ....................... 345/684 |
| 6,300,937 | B1 | | 10/2001 | Rosenberg |
| 6,353,427 | B1 | * | 3/2002 | Rosenberg .................. 345/156 |
| 6,405,432 | B1 | | 6/2002 | Sedor et al. |
| 6,437,771 | B1 | | 8/2002 | Rosenberg et al. |
| 6,642,857 | B1 | * | 11/2003 | Schediwy et al. ............ 341/20 |
| 6,700,564 | B1 | * | 3/2004 | McLoone et al. ........... 345/156 |
| 6,710,707 | B1 | * | 3/2004 | Onodera ................. 340/407.1 |
| 6,727,889 | B1 | * | 4/2004 | Shaw ......................... 345/163 |

FOREIGN PATENT DOCUMENTS

| WO | WO 97/19440 A1 | 5/1997 |
| WO | WO 99/14650 A2 | 3/1999 |
| WO | WO 00/68927 A1 | 11/2000 |

OTHER PUBLICATIONS

"LCD Pool: Play 8-Ball or Billiards" website: http://www.excaliburelectronics.com/lcdpool.html and User's Guide.

* cited by examiner

*Primary Examiner*—Alexander Eisen
(74) *Attorney, Agent, or Firm*—Brian M. Mancini; Randall S. Vaas (57) ABSTRACT

A proportional force input apparatus for an electronic device includes a mechanism operable by a user of the electronic device, such as a stylus inserted into a spring-loaded socket of the device. The mechanism provides a tactile feedback to the user proportional to a force applied by the user. A variable strength sensor detects the force applied by the user to the mechanism and converts this to an electrical signal proportional to the force applied by the user. A processor operates to input the electric signal from the variable strength sensor and provide force information to an application running on the electronic device. Optionally, a second sensor can detect rotation of the stylus. As a result, a stylus can be used to provide vector information to an application such as a game.

14 Claims, 5 Drawing Sheets

PROPORTIONAL FORCE INPUT APPARATUS FOR AN ELECTRONIC DEVICE

FIELD OF THE INVENTION

The present invention relates generally to a user interface input apparatus for an electronic device, and more particularly to an input apparatus for a communication device that provides information on a proportional amount of applied force.

BACKGROUND OF THE INVENTION

Personal communication devices, such as cellular radiotelephones are becoming more versatile, and are being used for electronic tasks other than mere communication. Some of these additional tasks are using the communication device as an organizer or for game play, for example. However, many existing devices do not have the user interface to take full advantage of these applications. For example, with the addition of gaming to many personal communication devices, users are now looking for various addition means of interacting with the device. It would be of benefit to provide more articulate and accurate emulation of gaming movements on a radiotelephone.

Input devices for personal electronic devices are limited today to buttons, a stylus or pen, or a rotating mechanism (e.g. trackball, joystick, etc). These types of input devices do not accurately emulate the movement a person would make when playing electronic games. In addition, these input devices do not provide a measure for variable strength (asserted force) other than using time to measure the duration an input is held and correlating that to a strength (force) value.

An alternate solution is to use an external controller for the device, as are presently used for stand-alone gaming systems. Many devices support this option, but require modification for a RS232 port, USB port, etc. External controllers are more flexible and can provide more functionality, but they are generally expensive and larger than the communication device itself, which would be too bulky for a typical user. Moreover, an external controller accessory would add significant cost to the device.

Therefore, there is a need for variable strength input device for portable electronic devices. In particular, what is needed is an apparatus to directly translate an applied force as a signal to a gaming application. It would also be of benefit if a tactile force feedback can be supplied to the user of the device. It would also be an advantage to provide a mechanism that allows a user more than one degree of freedom of movement or force. Another advantage would be to provide a low cost implementation of a variable strength input device.

DETAILED DESCRIPTION OF THE PREFERRED EMBODIMENTS

The present invention provides a variable strength input device for portable electronic devices. The device can be implemented with a stylus, rotary dial, or slider mechanism. The device is spring-loaded so that it provides a feedback to the user and a direct relationship between force and software response. In the most desirable implementation, an existing stylus (such as is used for a Personal Digital Assistant) is designed to be re-used for the variable strength input device. In particular, the present invention uses spring tensioning or other mechanisms such as elastics, etc. to provide the variable force resistance to the user. The idea uses a stylus in one implementation to very accurately emulate many common game input movements. The device can also be used for two-dimensional navigation, saving the cost of another means of movement or navigation on a given device.

An advantage of the present invention over the prior art is that one input apparatus is used to provide both positive and negative input (e.g. push/pull, positive/negative rotation), whereas the prior art would require two separate buttons to generate this type of input data. Further, the invention provides a direct relationship between a user's applied force and a distance (linear or angular) measurement. The prior art relies on a user to press and hold a button for a period of time. The longer the button is held, the greater the virtual force used by the gaming application. This is a false relationship between the input device and force used by the application.

The present invention enhances the gaming experience for a user by providing more realistic interaction with the game. Moreover, the proportional strength mechanism is integrated into a radiotelephone, and is coupled to the radiotelephone software. Further, an existing stylus (and existing hole for the stylus) is used to provide force feedback input. In effect, the present invention eliminates the need for an external controller, and can be used to provide input for a wide variety of games. For example, the spring-loaded stylus of the present invention directly emulates the plunger that launches a ball in a pinball or pachinko game. The spring-loaded stylus can also emulate the pull on a bowstring in a hunting game, for example, or the movement and force of a pool cue. A spring-loaded release can also emulate the swing of a bat, tennis racquet, golf club, hockey stick, throwing a football, etc.

In practice, the direct relationship between an applied force and the game reaction will add a new level of user experience to portable device gaming. The apparatus of the present invention will allow a user to hone their gaming skills based on a realistic force relationship than cannot be supplied in the prior art. With the present invention, the emulation of games will more closely match the real-life equivalent, resulting in more user enjoyment and satisfaction.

Figure 1:
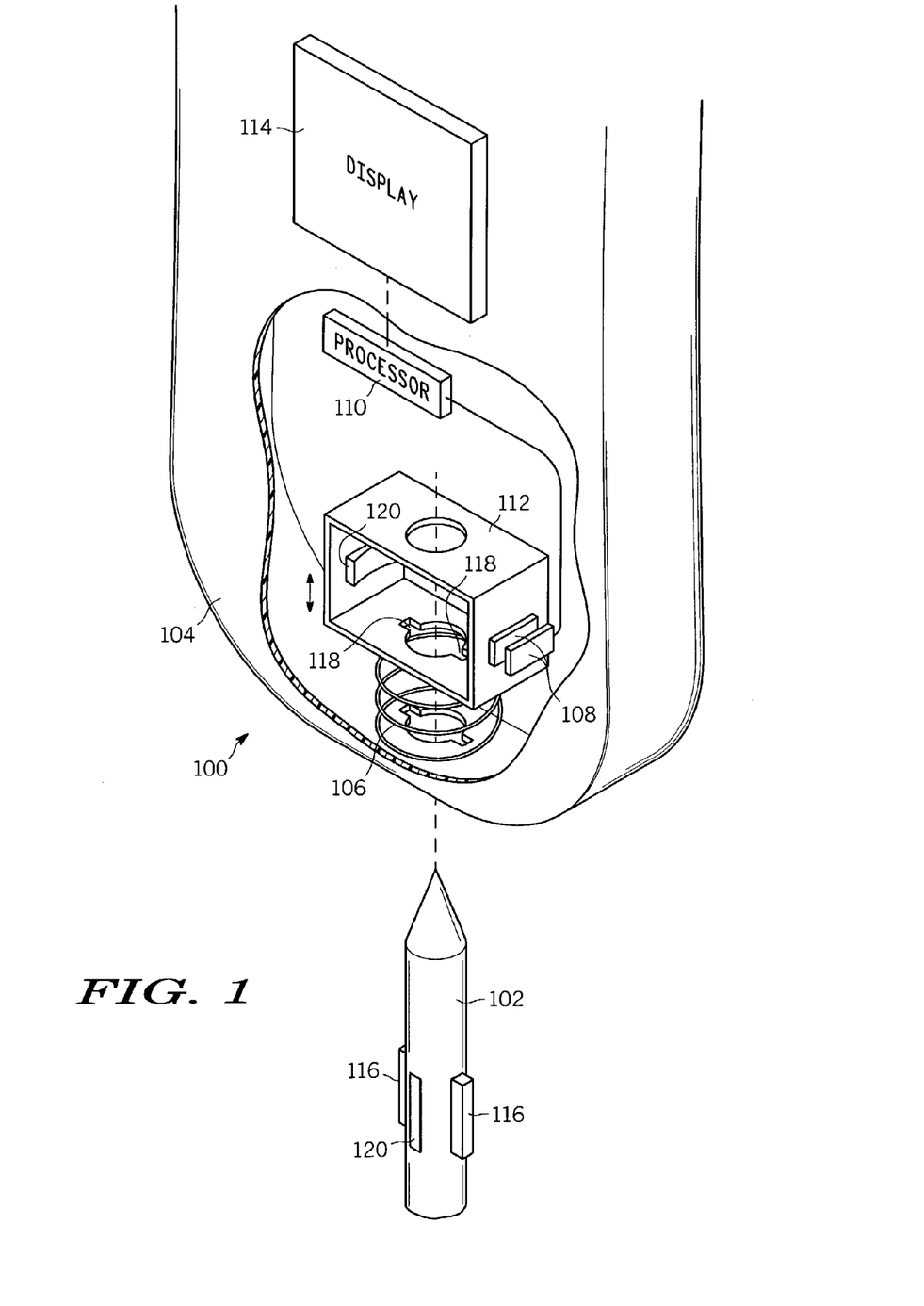
FIG. 1 shows an exploded perspective view of an apparatus, in accordance with the present invention.

FIG. 1 illustrates a proportional force input apparatus for an electronic device 104, in accordance with the present invention. The apparatus includes a mechanism 100 operable by a user of the electronic device 104. In particular, the user operates the mechanism using an actuator 102. The mechanism 100 provides a tactile feedback to the user proportional to a force applied to the actuator 102 by the user. Specifically, the tactile feedback is provided by a spring 106 or flexible elastic material or elastomer. In the present invention, "spring" can refer to any type of device that can resist the movement of the input device and snap back to a neutral position. The more a force is applied to the spring the more that the spring 16 pushes back against the user. Preferably, the mechanism 100 and spring 106 of the mechanism allow two-way motion in a linear direction. In particular, the user can push or pull the mechanism to apply a positive or negative force.

A variable strength sensor 108 is coupled to the mechanism 100 and detects the force applied by the user to the mechanism 100. The variable strength sensor 108 converts the mechanical movement, in response to an applied force, to an electrical signal proportional to the force applied by the user. The electrical signal is applied to a processor 110 that is electrically coupled to the variable strength sensor 108. The processor 110 is operable to input the electric signal from the variable strength sensor 108 and provide force information to an application running on the electronic device 104. It is envisioned that the force information would be applicable to gaming software running on the processor, as well as other software that could utilize force information.

Figure 2:
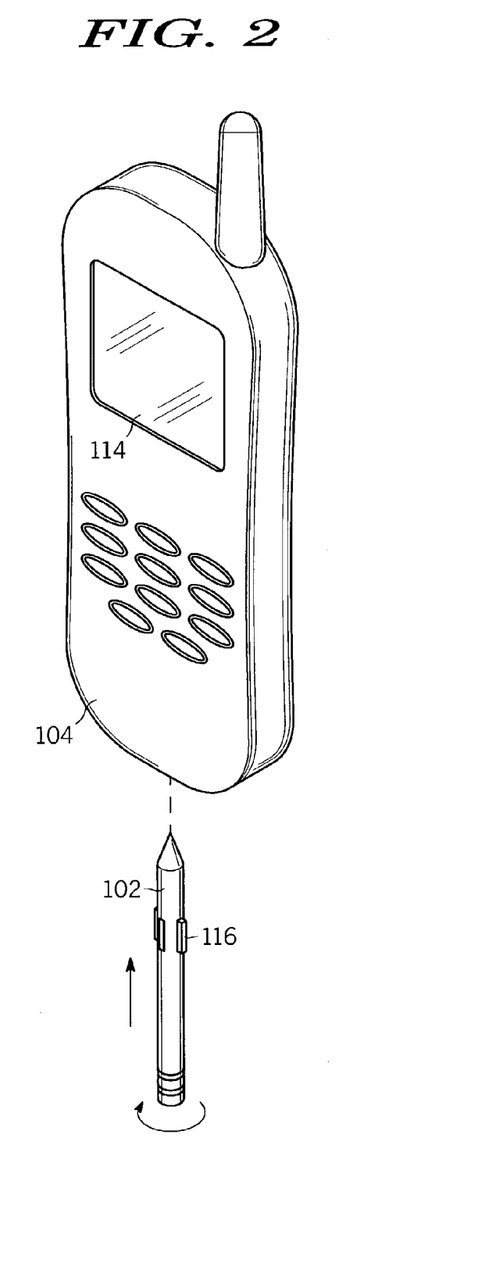
FIG. 2 shows a perspective view of the assembly of the apparatus of FIG. 1.
Figure 3:
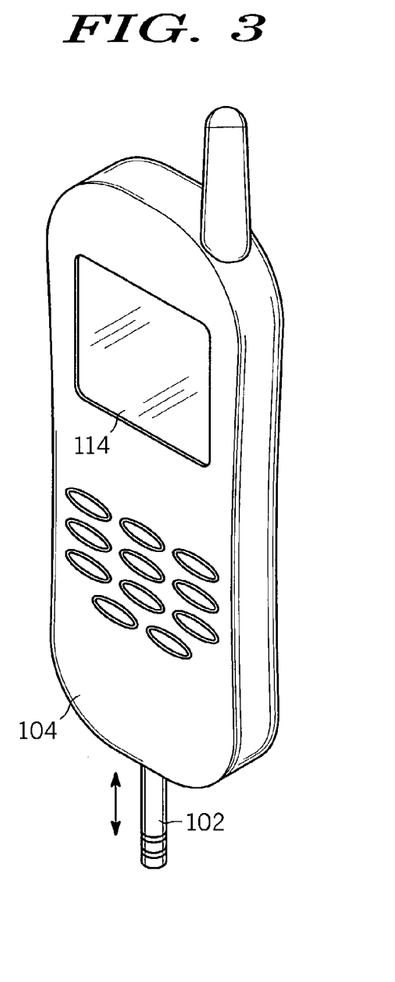
FIG. 3 shows a perspective view of the operation of a first embodiment of the apparatus of FIG. 1.

In a first embodiment, the mechanism 100 includes a spring-loaded socket mechanism 112 disposed within or on the electronic device 104. The socket mechanism 112 has a central neutral position (as shown) and is operable to move in either of opposite directions with the spring 106 providing increased force against the user as the socket mechanism 112 is extended in either direction from the neutral position. Specifically, the socket/slider mechanism 112 is a spring-loaded socket and the actuator 102 is a stylus. Preferably, the stylus is an existing accessory of the device, such as would be available in a Personal Digital Assistant (PDA) device. Moreover, the storage receptacle for the stylus in a PDA could be converted to the socket arrangement of the present invention, thereby saving cost and space in the electronic device, which are always at a premium. The spring-loaded socket in the device is adapted to receive and engage the stylus, wherein the spring provides increasing force against the stylus as the stylus moves the socket within the device. For example, as shown in FIGS. 2 and 3, the stylus can be inserted into the device and into the socket and given a one-quarter turn to lock into the sliding socket mechanism 112.

Referring back to FIG. 1, in operation, the electronic device 104 is a communication device with a display 114 and a stylus 102 for interacting with the display by providing force information through the sensor 108 and processor 110 to an application running thereon. In practice, the stylus 102 includes at least one key 116 disposed thereon for engaging a keyway 118 in the socket 112 such that a portion of the stylus 102 extends outward from the device (reference FIGS. 2 and 3). Optionally, a ball-and-catch detent can be used or other suitable device for engaging a stylus and socket. The socket 112 has a neutral linear position and is operable to move against the spring 106 in either of opposite linear directions with the spring providing increased force against the stylus 102 as the stylus is pushed inward into the device 104 from the neutral position and as the stylus 102 is pulled outward from the device 104 from the neutral position.

The variable strength sensor 108 includes a portion fixed to the wall of the device 104 and a portion fixed the sliding socket mechanism 112. As the portions of the sensor 108 separate a changing strength electrical signal is sent to the processor, which interprets this changing strength as a change in force to the application. In other words, the apparatus 100 senses the movement of the stylus 102 in the device and translates the distance moved (proportional to the force applied) into strength or force information for use by an application running on the processor 110. The sensor can be implemented in either a contactless mode (as shown) or a contact mode. For example, a contactless sensor can comprise a light sensor, a magnetic field sensor, a variable impedance (capacitive or inductive) sensor, and the like. A contact sensor can include a roller, variable resistance potentiometer, and the like.

Figure 4:
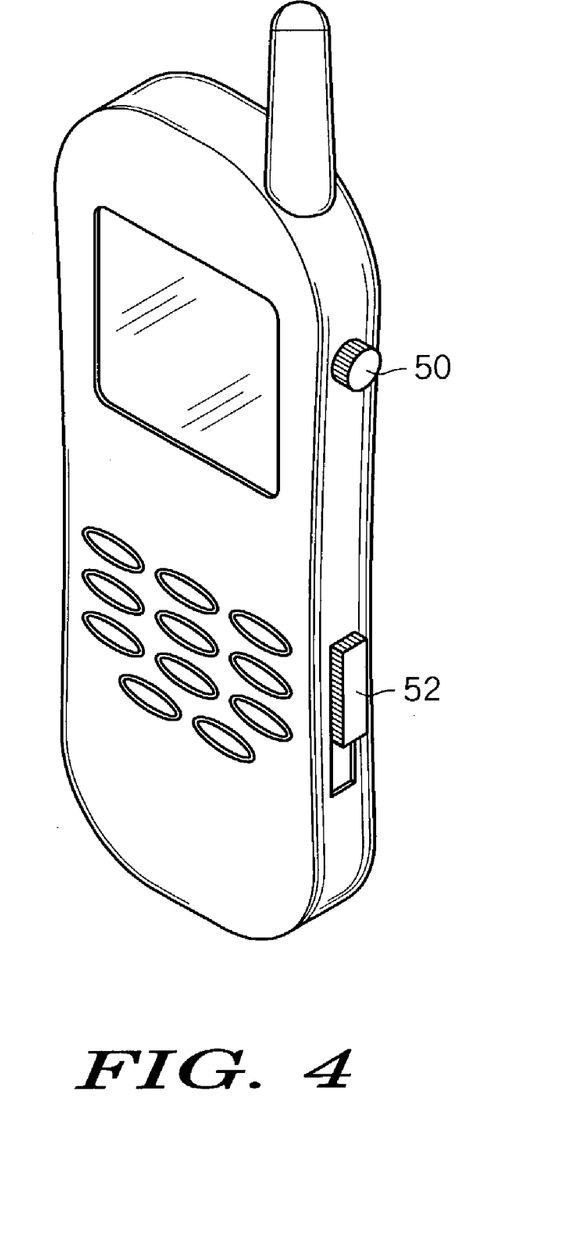
FIG. 4 shows a perspective view of alternate embodiments of an apparatus, in accordance with the present invention.

The stylus and socket arrangement in a two-way linear arrangement is preferred. However, optional arrangements for the present invention can also be used successfully. For example, the stylus assembly can be used to only provide a rotational motion to provide the force information, without any linear component. In addition, as represented in FIG. 4, a spring-loaded rotary dial 50 or a spring-loaded slider pad 52, can also be used with a variable strength sensor to provide two-way force information. For example, where the apparatus includes a spring-loaded rotary dial disposed on the electronic device, the spring provides increasing force against the user as the rotary dial is turned in either direction. Obviously, the actual mechanism and sensor arrangement for these embodiments will be different from that shown for the stylus and socket configuration, but could be determined easily by one of ordinary skill in the art without undue experimentation.

Figure 5:
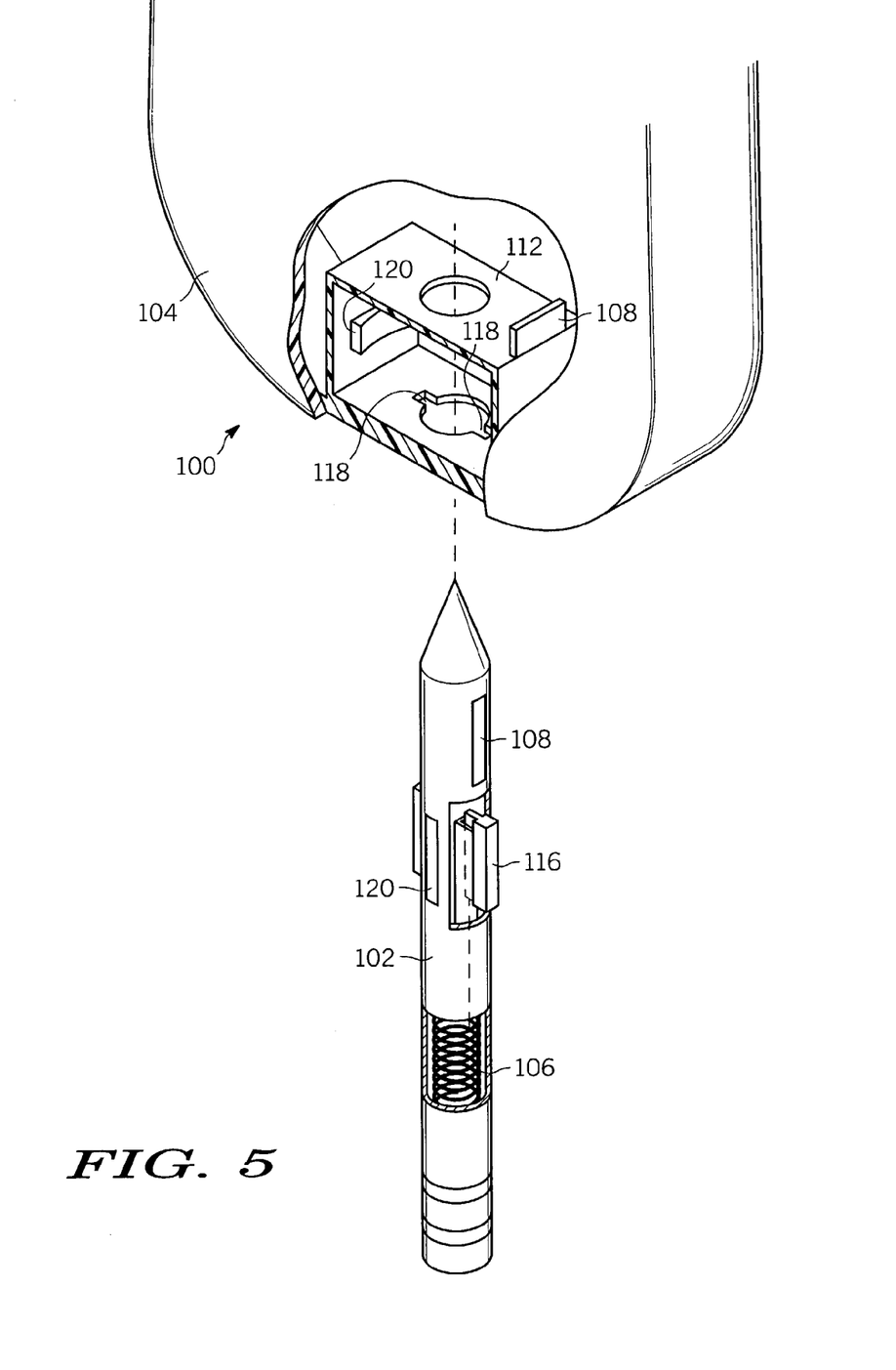
FIG. 5 shows a modified embodiment of the stylus of FIG. 1.

In an alternate, more compact embodiment of the apparatus of the present invention, the spring 106 can be incorporated into the stylus itself, as shown in FIG. 5, saving space and hardware in the device. In this case, the socket mechanism 112 no longer needs to slide within the device 104 and can become part of the housing of the device 104. Instead, the stylus slides within the device with an applied force. Portions of the variable strength sensor 108 are now disposed on the stylus and the housing of the device to detect motions of the stylus. All other operability is the same as that described for FIG. 1.

In a preferred embodiment, the apparatus of the present invention includes a second degree of freedom of motion. Referring to FIGS. 1 and 5, a second rotational sensor 120 can be included in the apparatus 100 to detect a rotational movement of the stylus in the socket and convert this to a second electrical signal to the processor. In this case the rotational motion is orthogonal to the linear motion previous described. This second sensor 120 can be of any configuration, including the same type as the linear sensor previously described. The second sensor includes portions 120 on the stylus and the socket mechanism. The second electrical signal can be used to provide motion or directional, as well as a second force signal to the processor. For example, if the stylus were free to rotate within the socket (using a contactless optical sensor as an example), the second electrical signal could provide directional or motional signal, which, along with the first force signal, could be interpreted by the application running on the processor as vector information.

Alternatively, if the stylus 102 were rotationally locked with the socket 112 the second sensor 120 could be used as a second variable strength sensor that detects a rotational force applied by the user to the mechanism and converts this to a second electrical signal to the processor proportional to the rotational force applied by the user. The same spring 106 can be used to provide the linear bias for the first force sensor and the rotational bias for the second force sensor. In this case, the socket again has a central neutral position and is operable to move against the spring in either of opposite rotary directions with the spring providing increased force against the stylus as the stylus is rotated clockwise from the neutral position and counterclockwise from the neutral position.

Alternatively, an additional force feedback mechanism can be included to provide the rotational bias for the second force sensor. A preferred embodiment of this would be to enable the user to choose when to engage the rotational force feedback mechanism depending on the given application. This can be used, for example, to lock the socket mechanism so that it can only move longitudinally. Then an additional spring or elastomer (e.g. elastic band or the like) can be added to provide the rotational feedback. With separate feedback units, the apparatus could be configured so that the user could engage, or disengage either of the feedback mechanisms by flipping a switch externally, or by the depth of insertion of the stylus. This would enable different operating modes. For example, in a billiard game, it would be beneficial to have force feedback longitudinally, but not rotationally. For games where true joystick-type input is desired, the rotational feedback could be engaged.

Figure 6:
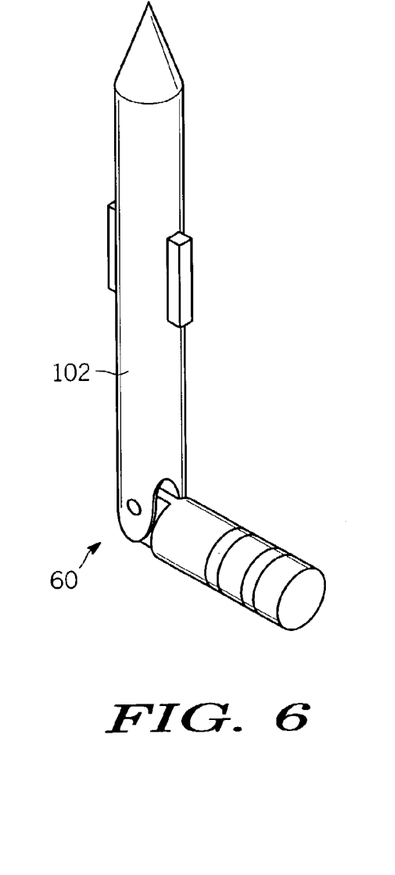
FIG. 6 shows a perspective view of the operation of a second embodiment of the apparatus of FIG. 1 using the stylus of FIG. 5.
Figure 7:
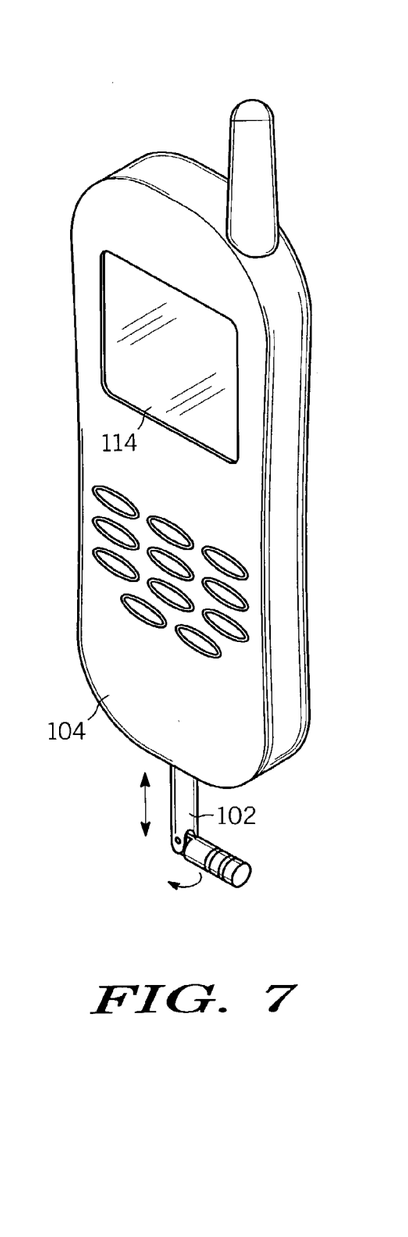
FIG. 7 shows a perspective view illustrating the operation of the second embodiment according to FIG. 6.

In the embodiment of FIGS. 6 and 7, it would be an advantage to provide a stylus 102 that includes a jointed portion 60 that can be swung into an angled position to provide increased leverage for a user to apply a rotational force with the stylus. Preferably, the jointed portion 60 can be locked into position. This configuration would be similar to a joystick configuration with the difference that, instead of an X-Y swivel action, the present invention provides a linear in-and-out action that provides a variable strength input, due to detecting the depth that the stylus is inserted or withdrawn, along with a rotational action detecting the amount of rotation in either direction to provide force, directional, or motional information for two dimensions.

Although the invention has been described and illustrated in the above description and drawings, it is understood that this description is by way of example only and that numerous changes and modifications can be made by those skilled in the art without departing from the broad scope of the invention. Although the present invention finds particular use in portable cellular radiotelephones, the invention could be applied to any communication device, including pagers, electronic organizers, and computers. The present invention should be limited only by the following claims.

What is claimed is:

1. A proportional force input apparatus for an electronic device, the apparatus comprising:
    a mechanism operable by a user of the electronic device, the mechanism provides at least two way tactile feedback to the user proportional to a force applied by the user;
    at least one variable strength sensor that detects the force applied by the user in at least two directions to the mechanism and converts this to an electrical signal proportional to the force in at least two directions applied by the user;
    a processor electrically coupled to the variable strength sensor, the processor operable to input the electric signal from the variable strength sensor and provide force information to an application running on the electronic device wherein the mechanism is spring-loaded socket adapted to receive and engage a removable stylus, the spring provides increasing force against the stylus as the stylus moves the socket.

2. A proportional force input apparatus for an electronic device, the apparatus comprising:
    a mechanism operable by a user of the electronic device, the mechanism provides a tactile feedback to the user proportional to a force applied by the user, wherein the mechanism is spring-loaded socket in the electronic device adapted to receive and engage a stylus, the spring provides increasing force against the stylus as the stylus moves the socket;
    a variable strength sensor that detects the force applied by the user to the mechanism and converts this to an electrical signal proportional to the force applied by the user;
    a processor electrically coupled to the variable strength sensor, the processor operable to input the electric signal from the variable strength sensor and provide force information to an application running on the electronic device
    and wherein the stylus includes a key disposed thereon for engaging a keyway in the socket such that a portion of the stylus extends outward from the device, and wherein the socket has a central neutral position and is operable to move against the spring in either of opposite rotary directions with the spring providing increased force against the stylus as the stylus is rotated clockwise from the neutral position aid counterclockwise from the neutral position.

3. A proportional force input apparatus for an electronic device, the apparatus comprising:
    a mechanism operable by a user of the electronic device, the mechanism provides a tactile feedback to die user proportional to a force applied by the user, wherein the mechanism is a spring-loaded socket adapted to receive and engage a removable stylus, the spring providing increasing force as the stylus moves the socket;
    a variable strength sensor that detects the force applied by the user to the mechanism and converts this to an electrical signal proportional to the force applied by the user;
    a processor electrically coupled to the variable strength sensor, the processor operable to input the electric signal from the variable strength sensor and provide force information to an application running on the electronic device
    and wherein the stylus includes a key disposed thereon for engaging a keyway in the socket such that a portion of the stylus extends outward from the device, and wherein the socket has a neutral linear position and is operable to move against the spring in either of opposite linear directions with the spring providing increased force against the stylus as the stylus is pushed inward into the device from the neutral position and as the stylus is pulled outward from the device from the neutral position.

4. The apparatus of claim 3, further comprising a rotational sensor that detects a rotation of the stylus in the mechanism and converts this to a second electrical signal to the processor that provides directional information to the application running on the electronic device.

5. The apparatus of claim 4, further comprising a second variable strength sensor that detects a rotational force applied by the user to the mechanism and converts this to a second electrical signal to the processor proportional to the rotational force applied by the user, wherein the stylus includes a jointed portion that can be swung into an angled position to provide increased leverage for a user to apply a rotational force with the stylus, and wherein the socket has a neutral rotational position and is operable to move against the spring in either of opposite rotary directions with the spring providing increased force against the stylus as the stylus is rotated clockwise from the neutral position and counterclockwise from the neutral position.

6. A proportional force input apparatus for a communication device with a display and a stylus for interacting with the display, the apparatus comprising:
- a mechanism disposed in the device, the mechanism including a spring-loaded socket adapted to receive and engage the stylus, when engaged the stylus includes a portion thereof extending outward from the device for manipulation by the user, the socket has a neutral linear position and is operable to move against the spring in either of opposite linear directions with the spring providing increased force against the stylus as the stylus is pushed inward into the device from the neutral position and as the stylus is pulled outward from the device from the neutral position;
- a variable strength sensor that detects the linear force applied by the stylus to the socket and converts this to an electrical signal proportional to the force applied by the user;
- a processor electrically coupled to the variable strength sensor, the processor operable to input the electric signal from die variable strength sensor and provide force information to an application running on the electronic device.

7. The apparatus of claim 6, further comprising a rotational sensor that detects a free rotation of the stylus in the socket and converts this to a second electrical signal to the processor that provides directional information, the force and directional information provide vector information to the application running on the electronic device.

8. The apparatus of claim 6, wherein the stylus locks into the socket and the socket is operable to move against the spring in either of opposite rotary directions with the spring providing increased force against the stylus as the stylus is rotated clockwise from the neutral position and counterclockwise from the neutral position, and further comprising a second variable strength sensor that detects a rotational force applied by the stylus to the socket and converts this to a second electrical signal to the processor proportional to the rotational force applied by the user.

9. A proportional force input apparatus for a communication device with a display and a stylus for interacting with the display, the apparatus comprising:
- a mechanism disposed in the device, the mechanism including a spring-loaded socket adapted to receive and engage the stylus, when engaged the stylus includes a portion thereof extending outward from the device for manipulation by the user, the socket has a neutral linear position and is operable to move against the spring in either of opposite linear directions with the spring providing increased force against the stylus as the stylus is pushed inward into the device from the neutral position and as the stylus is pulled outward from the device from the neutral position;
- a variable strength sensor that detects the linear force applied by the stylus to the socket and converts this to an electrical signal proportional to the force applied by the user;
- a processor electrically coupled to the variable strength sensor, the processor operable to input the electric signal from the variable strength sensor and provide force information to an application running on the electronic device;

wherein the stylus locks into the socket and the socket is operable to move against the spring in either of opposite rotary directions with the spring providing increased force against the stylus as the stylus is rotated clockwise from the neutral position and counterclockwise from the neutral position, and further comprising a second variable strength sensor that detects a rotational force applied by the stylus to the socket and converts this to a second electrical signal to the processor proportional to the rotational force applied by the user, and the stylus includes a jointed portion that can be swung into an angled position to provide increased leverage for a user to apply a rotational force with the stylus.

10. A proportional force input apparatus for a communication device utilizing an existing stylus therefor, the apparatus comprising:
- a mechanism disposed in the device, die mechanism including a spring-loaded socket adapted to receive and engage the stylus and provide a tactile feedback to the user proportional to a force applied by the user with the stylus, when engaged the stylus includes a portion thereof extending outward from the device for manipulation by the user;
- two sensors coupled to the mechanism, the sensors detect orthogonal motions of the stylus resulting from force applied to the stylus by the user and converts these motions to two electrical signals proportional to the respective motions;
- a processor electrically coupled to the sensors, the processor operable to input the electric signals from the sensors and provide vector information to an application running on the electronic device.

11. The apparatus of claim 10, wherein at least one of the sensors is a variable strength sensor that detects the force applied by the stylus against the spring and converts this to an electrical signal proportional to the force applied by the user.

12. A proportional force input apparatus for a communication device utilizing an existing stylus therefor the apparatus comprising:
- a mechanism disposed in the device, the mechanism including a spring-loaded socket adapted to receive and engage the stylus and provide a tactile feedback to the user proportional to a force applied by the user with the stylus, when engaged the stylus includes a portion thereof extending outward from the device for manipulation by the user;
- two sensors coupled to the mechanism, the sensors detect orthogonal motions of the stylus resulting from force applied to the stylus by the user and converts these motions to two electrical signals proportional to the respective motions;
- a processor electrically coupled to the sensors, the processor operable to input the electric signals from the sensors and provide vector information to an application running on the electronic device
- wherein at least one of the sensors is a variable strength sensor that detects the force applied by the stylus against the spring and converts this to an electrical signal proportional to the force applied by the user, and the socket has a central neutral position and is operable to move against the spring in either of opposite directions to provide increased force against the stylus as the stylus is moved away from the neutral position.

13. The apparatus of claim 12, wherein the variable force sensor detects linear motion such that the socket is operable to move against the spring in either of opposite linear directions with the spring providing increased force against the stylus as the stylus is pushed inward into the device from the neutral position and as the stylus is pulled outward from the device from the neutral position, and the second sensor is a rotation sensor to detect rotation of the stylus, which is free to rotate in the socket.

14. The apparatus of claim 12, wherein stylus locks into the socket and both sensors are variable force sensors with one of the sensors detecting linear force on the socket and one of the sensors detecting rotary force on the socket, the socket being operable to move against the spring in either of the opposite linear and rotary directions with the spring providing increased force against the stylus in either of the opposite linear and rotary directions from the neutral position.

* * * * *